(12) United States Patent
Klein et al.

(10) Patent No.: US 9,111,090 B2
(45) Date of Patent: Aug. 18, 2015

(54) DETECTION OF PHISHING ATTEMPTS

(75) Inventors: Amit Klein, Herzliya (IL); Michael Boodaei, Givataim (IL)

(73) Assignee: TRUSTEER, LTD., Tel Aviv (IL)

( * ) Notice: Subject to any disclaimer, the term of this patent is extended or adjusted under 35 U.S.C. 154(b) by 91 days.

(21) Appl. No.: 13/437,122

(22) Filed: Apr. 2, 2012

(65) Prior Publication Data

US 2013/0263264 A1     Oct. 3, 2013

(51) Int. Cl.
*G06F 11/00* (2006.01)
*G06F 21/55* (2013.01)
*H04L 29/06* (2006.01)

(52) U.S. Cl.
CPC ............ *G06F 21/552* (2013.01); *G06F 21/554* (2013.01); *H04L 63/1483* (2013.01)

(58) Field of Classification Search
CPC ........................ H04L 63/1416; H04L 63/1408
USPC .................................................... 726/22–25
See application file for complete search history.

(56) References Cited

U.S. PATENT DOCUMENTS

| | | |
|---|---|---|
| 2006/0253578 A1 | 11/2006 | Dixon et al. |
| 2009/0031033 A1 | 1/2009 | Deng et al. |
| 2009/0300768 A1* | 12/2009 | Krishnamurthy et al. ...... 726/26 |
| 2010/0049975 A1 | 2/2010 | Parno et al. |
| 2010/0095375 A1 | 4/2010 | Krishnamurthy et al. |
| 2011/0072262 A1* | 3/2011 | Amir et al. ..................... 713/168 |
| 2011/0185421 A1 | 7/2011 | Wittenstein et al. |
| 2012/0079575 A1* | 3/2012 | Yue et al. .......................... 726/7 |

FOREIGN PATENT DOCUMENTS

| | | |
|---|---|---|
| GB | 2461422 A | 1/2010 |
| WO | WO 2007/096659 A1 | 8/2007 |
| WO | WO 2011/018316 A1 | 2/2011 |

OTHER PUBLICATIONS

European Search Report for corresponding European Patent Application No. 13160190 mailed Jun. 6, 2013.
Kirda, E. et al. "Protecting Users Against Phishing Attacks with AntiPhish", Computer Software and Applications Conference, 29th Annual International, Edinburgh, Scotland, Jul. 2005, vol. 1, pp. 517-524.
Parno, B. et al. "Phoolproof Phishing Prevention", Financial Cryptography and Data Security Lecture Notes in Computer Science, Jan. 2006, pp. 1-19.
"About Dynamic Properties", Microsoft Develope Network Library, Microsoft Corporation, Inc. published May 8, 2008, author unknown, http://msdn.microsoft.com/en-us/library/ms537634%28v=vs.85%29.aspx, 6 pages.

* cited by examiner

*Primary Examiner* — Anthony Brown
(74) *Attorney, Agent, or Firm* — Daniel J. Swirsky; AlphaPatent Associates Ltd.

(57) ABSTRACT

A method for alerting a service provider and/or a user of a web browser of a phishing attempt comprises providing on a page that it is desired to protect against phishing, a Javascript that when caused by a phishing page to run not in the context of the original page generates an indication that a phishing attempt may exist.

2 Claims, 1 Drawing Sheet

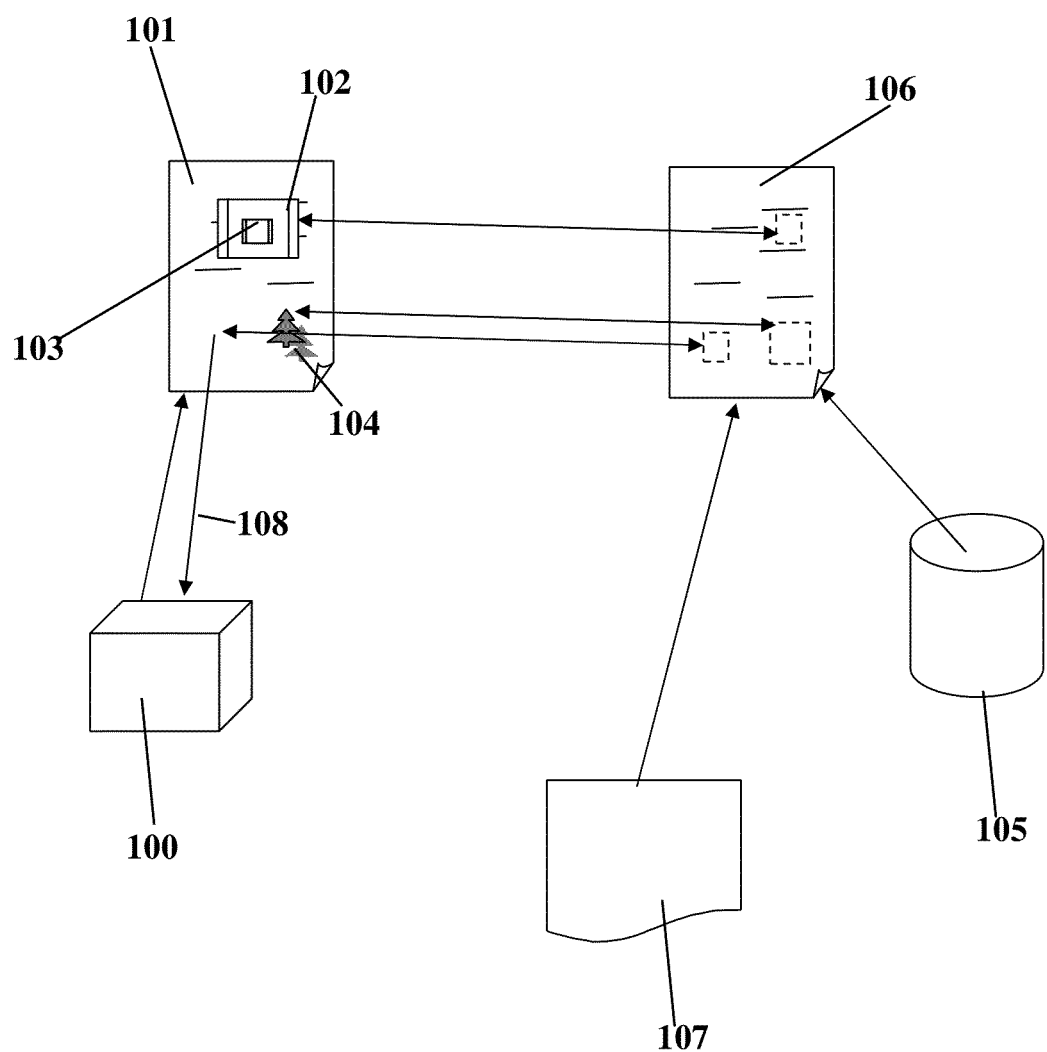

DETECTION OF PHISHING ATTEMPTS

FIELD OF THE INVENTION

The present invention relates to the field of Internet security. More particularly, the invention relates to a method for preventing phishing attempts.

BACKGROUND OF THE INVENTION

Phishing is defined as a way of attempting to acquire information such as usernames, passwords, and credit card details by masquerading as a trustworthy entity in an electronic communication. One particularly dangerous type of phishing directs users to enter details at a fake website, e.g. the website of a financial institution, or a page which requires entering financial information, the look and feel of which are almost identical to the legitimate one. Attempts to deal with the growing number of reported phishing incidents include legislation, user training, public awareness, and technical security measures.

Because of the ever-growing methods and attempts to obtain fraudulently this type of information there is a constant need to provide solutions that will alert users and service providers when a phishing attempt is suspected. It is an object of the present invention to provide a method and related means to achieve this goal.

SUMMARY OF THE INVENTION

The invention is directed to a method for alerting a service provider and/or a user of a web browser of a phishing attempt, comprising providing on a page that it is desired to protect against phishing, a Javascript that when caused by a phishing page to run not in the context of the original page generates an indication that a phishing attempt may exist.

In one embodiment of the invention the indication that a phishing attempt may exist includes transferring data to the owner of the protected page. In another embodiment of the invention the indication that a phishing attempt may exist includes alerting the user, who has reached the phishing website.

Alerting can be effected through any suitable channel, such as via SMS, e-mail, etc., and according to one embodiment of the invention alerting is done through the user's browser.

The invention is also directed to a protected webpage comprising a Javascript that when caused by a phishing page to run not in the context of the original page, generates an indication that a phishing attempt may exist.

BRIEF DESCRIPTION OF THE DRAWINGS

In the drawings:
FIG. 1 schematically illustrates the operation of one illustrative embodiment of the invention;

DETAILED DESCRIPTION OF THE INVENTION

Phishing websites masquerade as legitimate ones by presenting to the user a page that has the look and feel of the original page to which the user wanted to navigate (e.g., the log in page of his bank account). In many cases, however, the phishing website does not copy into the fake page JavaScript resources (".JS" files) and even images that are located on the page it is copying. Instead, when the user's browser reaches the phishing webpage, the JSs and the images are rendered from the original, legitimate website.

In a different scenario, fraudsters may copy the JS (with the additional code) to their own site (if they create their kit after the code according to the invention is deployed to the bank's site). In such a case, the method of the invention is still operative, although the JS code is used in the phishing site.

According to the invention phishing attempts of this type are discovered through the use of an added JS code (referred to hereinafter as "added JS code"), which is included with those JS resources that are not copied to the phishing website. When the phishing website invokes JS from the legitimate site, the added JS code checks the context of the website in which it is running and, if it is not running in the context of the legitimate website it determines that a phishing attempt is ongoing. This determination is carried out, for instance, by utilizing the "document.location" DOM property, which contains the current page's URL. When a phishing attempt is discovered in this way the added JS code can immediately report to the owner of the legitimate websites and/or to the user, and potentially block further access to the legitimate websites and/or alerting the user so he discontinues the submission of information to the phishing website.

The additional JS code can be programmed to perform additional activities on the phishing website. For instance, adding an onSubmit event handler so that when the user submits credentials (in the phishing site), the added JS code recovers the credentials and sends them to an external server, thus enabling the genuine site owner (e.g., a bank) to freeze the user's account pending resolution of the issue.

Looking now at FIG. 1, a website 100, which may be a financial institute such as a bank, or any other service supplier, presents to its users a log-in page 101, which in this simplified example references a JS file 102, designed to run a conventional task (which is irrelevant to the invention and therefore not discussed in detail), and a New JS 103, which is found inside the original JS 102, as well as an image 104. A phishing website 105 generates a phishing (fake) Web page 106, which is designed to mislead a user, operating a browser 107, into believing that he has reached Web log in page 101, while in fact he has reached phishing page 106.

The phishing websites has not copied JS 102, and image 104 into web page 106, and when presenting it to browser 107 it renders them from original website 100. At this point New JS 103, which is part of JS 102 is run, identifies that it is running in the context of a page different from the original one and that, therefore, the alterations should be identified as a phishing attempt. In the simplified example of FIG. 1 New JS 103 alerts website 100 of the phishing attempt (arrow 108), which in turn takes corrective action according to its program, e.g., blocks the access of the user to the system and/or alerts him of the situation.

A special case, which is of particular interest, is when a Cascading Style Sheets is used. Cascading Style Sheets (CSS) is a style sheet language used to describe the presentation semantics (the look and formatting) of a document written in a markup language. Its most common application is to style web pages written in HTML and XHTML, but the language can also be applied to any kind of XML document, including plain XML, SVG and XUL. CSS is designed primarily to enable the separation of document content (written in HTML or a similar markup language) from document presentation, including elements such as the layout, colors, and fonts, to improve content accessibility and to provide more flexibility and control in the specification of presentation characteristics. The Internet Explorer browser allows running Javascript inside CSS, via the "expression" property (see http://msdn.microsoft.com/enus/library/ms537634%28v=vs.85%29.aspx). Thus, even if a phishing site does not embed any JS from the original site (but does embed at least one CSS file), it is still possible to employ the above technique by using the CSS expression with the added JS code in it (this works only for browsers which support the expression property in CSS).

All the above description has been provided for the purpose of illustration and is not intended to limit the invention in any way. Many different setups can be devised, in which different JSs are used to generate phishing notifications. Moreover, the skilled person will easily devise many different arrangements for acting upon the discovery of a potential phishing attempt, all without exceeding the scope of the invention.

The invention claimed is:

1. An anti-phishing system comprising:
 a non-transitory, computer-readable storage medium; and
 a log-in webpage of a service provider, the log-in webpage stored on the computer-readable storage medium, the log-in webpage comprising Javascript code configured to
  determine, when the Javascript code is running, that the Javascript code is running in the context of a phishing website,
  add, in response to determining that the Javascript code is running in the context of the phishing website, an onSubmit event handler on the phishing website,
  generate, in response to determining that the Javascript code is running in the context of the phishing website, an indication of a phishing attempt,
  detect, using the onSubmit event handler, when a user submits credentials in the context of said phishing website,
  recover said credentials using said onSubmit event handler, and
  send said indication of a phishing attempt and said credentials to a server configured to protect an account of the user.

2. An anti-phishing method comprising:
 configuring a log-in webpage stored on a non-transitory, computer-readable storage medium of a service provider, the log-in webpage comprising Javascript code configured to
  determine, when the Javascript code is running, that the Javascript code is running in the context of a phishing website,
  add, in response to determining that the Javascript code is running in the context of the phishing website, an onSubmit event handler on the phishing website,
  generate, in response to determining that the Javascript code is running in the context of the phishing website, an indication of a phishing attempt
  detect, using the onSubmit event handler, when a user submits credentials in the context of said phishing website,
  recover said credentials using said onSubmit event handler, and
  send said indication of a phishing attempt and said credentials to a server configured to protect an account of the user; and
 providing access to the log-in web page.

* * * * *